United States Patent
Chaubey et al.

(10) Patent No.: US 10,063,451 B2
(45) Date of Patent: Aug. 28, 2018

(54) PROVIDING APPLICATION METADATA USING EXPORT PROTOCOLS IN COMPUTER NETWORKS

(71) Applicant: Juniper Networks, Inc., Sunnyvale, CA (US)

(72) Inventors: Rajeev Chaubey, Bangalore (IN); Premenjit Das, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 236 days.

(21) Appl. No.: 14/868,206

(22) Filed: Sep. 28, 2015

(65) Prior Publication Data

US 2017/0093681 A1    Mar. 30, 2017

(51) Int. Cl.
*H04L 12/26* (2006.01)
*H04L 12/24* (2006.01)
(Continued)

(52) U.S. Cl.
CPC .......... *H04L 43/18* (2013.01); *H04L 41/0806* (2013.01); *H04L 41/0853* (2013.01); *H04L 41/0869* (2013.01); *H04L 43/028* (2013.01); *H04L 67/2804* (2013.01); *H04L 69/03* (2013.01); *H04L 41/082* (2013.01)

(58) Field of Classification Search
CPC ... H04L 43/18; H04L 43/028; H04L 41/0853; H04L 41/0806; H04L 67/2804; H04L 69/03; H04L 41/0869; H04L 41/082
See application file for complete search history.

(56) References Cited

U.S. PATENT DOCUMENTS 8,826,296 B2 * 9/2014 Stephan ................ H04L 41/044 717/100
9,251,183 B2 * 2/2016 Mandelstein ......... G06F 17/303
(Continued)

FOREIGN PATENT DOCUMENTS

| EP | 2804344 A1 | 11/2014 | |
| WO | 2013184846 A1 | 12/2013 | |
| WO | WO-2013184846 A1 * | 12/2013 | ........... G06N 99/005 |

OTHER PUBLICATIONS

Zhang, et al., "Evaluation of the CRANE Protocol Against IPFIX Requirements," Internet Draft, Sep. 2002, 21 pp.
(Continued)

*Primary Examiner* — Uzma Alam
(74) *Attorney, Agent, or Firm* — Shumaker & Sieffert, P.A.

(57) ABSTRACT

In general, techniques for are described for providing application metadata using an Internet Protocol Flow Information eXport (IPFIX) protocol in computer networks. In one example, a first network device including a processor and a memory may perform the techniques. The processor may be configured to determine types of the application metadata that the first network device has a capability to detect through analysis of network packets. The application metadata may comprise data representative of network protocols used by networking processes that exchange packets. The memory may be configured to store the application metadata. The processor may further be configured to execute the IPFIX protocol to advertise the types of the application metadata to a second network device configured to collect a subset of the application metadata.

24 Claims, 4 Drawing Sheets

(51) Int. Cl.
  *H04L 29/08* (2006.01)
  *H04L 29/06* (2006.01)

(56) References Cited

U.S. PATENT DOCUMENTS

| | | | | |
|---|---|---|---|---|
| 2013/0021906 A1* | 1/2013 | Rahman | H04L 47/10 | 370/235 |
| 2013/0262703 A1* | 10/2013 | Dong | H04L 47/38 | 709/247 |
| 2014/0040656 A1* | 2/2014 | Ho | G06F 9/5077 | 714/3 |
| 2014/0101297 A1* | 4/2014 | Neisinger | H04L 65/4084 | 709/223 |
| 2014/0136680 A1* | 5/2014 | Joshi | H04L 43/026 | 709/224 |
| 2014/0279768 A1* | 9/2014 | Rash | G06N 5/02 | 706/14 |
| 2015/0039749 A1* | 2/2015 | Kwan | H04L 41/5067 | 709/224 |
| 2015/0286637 A1* | 10/2015 | Lee | G06F 17/30011 | 707/691 |
| 2015/0350956 A1* | 12/2015 | Bell | H04M 15/8214 | 455/405 |
| 2015/0363464 A1* | 12/2015 | Alves | G06F 17/30448 | 707/765 |
| 2015/0381737 A1* | 12/2015 | Quinn | H04L 67/12 | 709/217 |
| 2016/0006755 A1* | 1/2016 | Donnelly | H04L 63/0263 | 726/1 |
| 2016/0191568 A1* | 6/2016 | Nispel | H04L 43/04 | 726/1 |
| 2016/0234099 A1* | 8/2016 | Jiao | H04L 45/02 | |
| 2016/0321410 A1* | 11/2016 | Timmerman | G06F 19/328 | |
| 2017/0127115 A1* | 5/2017 | Lee | H04N 21/436 | |

OTHER PUBLICATIONS

Muenz, et al., "Configuration Data Model for the IP Flow Information Export (IPFIX) and Packet Sampling (PSAMP) Protocols," IETF, RFC 6728, Oct. 2012, 129 pp.

Zhang, et al. "XACCT's Common Reliable Accounting for Network Element (CRANE) Protocol Specification Version 1.0," Network Working Group, RFC 3423, Nov. 2002, 46 pp.

Extended European Search Report from counterpart European Application No. 16190749.8, dated Jan. 27, 2017, 13 pp.

Zseby et al., "Policy-Based Accounting," RFC 3334, Oct. 2002, 44 pp.

Quittek et al., "Requirements for IP Flow Information Export (IPFIX)," RFC 3917, Oct. 2004, 33pp.

Boschi et al., "Exporting Type Information for IP Flow Information Export (IPFIX) Information Elements," RFC 5610, Jul. 2009, 20 pp.

Claise et al., "Export of Structured Data in IP Flow Information Export (IPFIX)," RFC 6313, Jul. 2011, 71 pp.

Claise et al., "Cisco Systems Export of Application Information in IP Flow Information Export (IPFIX)," RFC 6759, Nov. 2012, 43 pp.

Claise et al., "Specification of the IP Flow Information Export (IPFIX) Protocol for the Exchange of Flow Information," RFC 7011, Sep. 2013, 76 pp.

Claise et al., "Information Model for IP Flow Information Export (IPFIX)," RFC 7012, Sep. 2013, 24 pp.

Trammell et al., "Guidelines for Authors and Reviewers of IP Flow Information Export (IPFIX) Information Elements," RFC 7013, Sep. 2013, 32 pp.

D'Antonio et al., "Flow Selection Techniques," RFC 7014, Sep. 2013, 33 pp.

Trammell et al., "Flow Aggregation for the IP Flow Information Export (IPFIX) Protocol," RFC 7015, Sep. 2013, 49 pp.

Claise et al., "Specification of the IP Flow Information Export (IPFIX) Protocol for the Exchange of IP Traffic Flow Information," RFC 5101, Jan. 2008, 63 pp.

Boschi et al., "IP Flow Information Export (IPFIX): Applicability and Future Suggestions for Network Security," Software Engineering Institute paper, Sep. 2005, 4 pp.

Response to the Extended Search Report dated Aug. 22, 2017, from counterpart European Application No. 16190749.8, filed Sep. 27, 2017, 28 pp.

Examination Report from counterpart European Application No. 16190749.8, dated May 24, 2018, 6 pp.

* cited by examiner

PROVIDING APPLICATION METADATA USING EXPORT PROTOCOLS IN COMPUTER NETWORKS

TECHNICAL FIELD

The invention relates to computer networks and, more specifically, to applying network services to network traffic traversing computer networks.

BACKGROUND

A computer network is composed of a set of nodes and a set of links that connect one node to another. For instance, a computer network may be composed of a set of routers while the set of links may be cables between the routers. When a first node in the network sends a message to a second node in the network, the message may pass through many links and many nodes. The set of links and nodes that the message passes through while traveling from the first node to the second node is referred to as a path through the network.

Network traffic may travel along the paths, passing through the routers, which may perform one or more operations in addition to routing the network traffic along the path. One such operation may include general flow-specific information gathering. That is, a router may collect information concerning flows of network traffic. A flow may be identified by a so-called five-tuple that includes a source address, a source port, a destination address, a destination port, and a protocol. The flow information may include statistics regarding traffic loads, such as a number of packets per flow per minute or an amount of data per flow per minute. As one example, the router may collect the flow information to provide local insight into network traffic loads.

Using an export protocol, the router may export the flow information. An example of an export protocol includes the Internet protocol flow information export (IPFIX) protocol defined in requests for comments (RFCs) 7011-7015. The router may export the flow information to allow for a number of different operations. For example, the router may export the flow information to a central managing device (such as a software defined network controller) to allow for redirection of traffic flows to avoid congesting identified, in part, by the exported flow information.

SUMMARY

In general, techniques for providing application metadata using an export protocol in a computer network are described. A network device, such as a network security appliance, may dynamically determine application metadata available to be exported via the export protocol. A router capable of performing, as one example, deep packet inspection (DPI) may identify application metadata. As such, the router may determine the capabilities of the DPI to identify different types of application metadata that the DPI is capable of detecting. The router may then advertise the different types of application metadata to collector devices using the export protocol. One or more collector devices may then request some subset of or possibly all of the types of application metadata using the export protocol.

In this respect, the techniques may enable a dynamic interaction between an export device (e.g., the above router) and the collector device (e.g., a software-defined networking controller) to allow for collection of subsets of the application metadata. The dynamic interaction and subsequent request for application metadata occurs rather than, as was previously provided via IPFIX and other export protocols, a push model of sending flow information from the export device to the collector device with little to no ability to request particular subsets of the flow information. The dynamic interaction and negotiation for application metadata may overcome obstacles of exporting what, in comparison to the size of the flow information, is a much larger amount (in terms of size) of application metadata. The foregoing techniques may leverage the IPFIX protocol (or other export protocols) to provide for the dynamic interaction between the export device and collector devices to provide a potentially standard way by which the export device provides application metadata.

In one example, a first network device including a processor and a memory may perform the techniques. The processor may be configured to determine types of the application metadata that the first network device has a capability to detect through analysis of network packets. The application metadata may comprise data representative of network protocols used by networking processes that exchange packets. The memory may be configured to store the application metadata. The processor may further be configured to execute the IPFIX protocol to advertise the types of the application metadata to a second network device configured to collect a subset of the application metadata.

In another example, a method comprises determining, by a first network device configured to export application metadata via an Internet Protocol Flow Information eXport (IPFIX) protocol, types of the application metadata that the first network device has a capability to detect through analysis of network packets. The application metadata comprises data representative of network protocols used by networking processes that exchange packets. The method further comprises executing, by the first network device, the IPFIX protocol to advertise the types of application metadata to a second network device configured to collect a subset of the application metadata.

In another example, a method comprises receiving, by a first network device, an advertisement via an Internet Protocol Flow Information eXport (IPFIX) protocol. The advertisement advertises types of application metadata that a second network device is capable of detecting through analysis of network traffic. The method further comprises exporting via the IPFIX protocol, the application metadata comprising data representative of network protocols used by networking processes that exchange packets. The method also comprises determining, by the first network device, a subset of the types of the application metadata that the first network device is configured to collect. Furthermore, the method comprises executing, by the first network device, the IPFIX protocol to request that the second network device export a subset of the types of the application metadata to the first network device.

In another example, a first network device comprises an interface configured to receive an advertisement via an Internet Protocol Flow Information eXport (IPFIX) protocol. The advertisement advertises types of application metadata that a second network device is capable of detecting through analysis of network traffic and exporting via the IPFIX protocol. The application metadata comprises data representative of network protocols used by networking processes that exchange packets. The first network device further comprises one or more processors configured to determine a subset of the types of application metadata that the first network device is configured to collect, and execute the IPFIX protocol to request that the second network device export a subset of the types of the advertised application metadata to the first network device.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
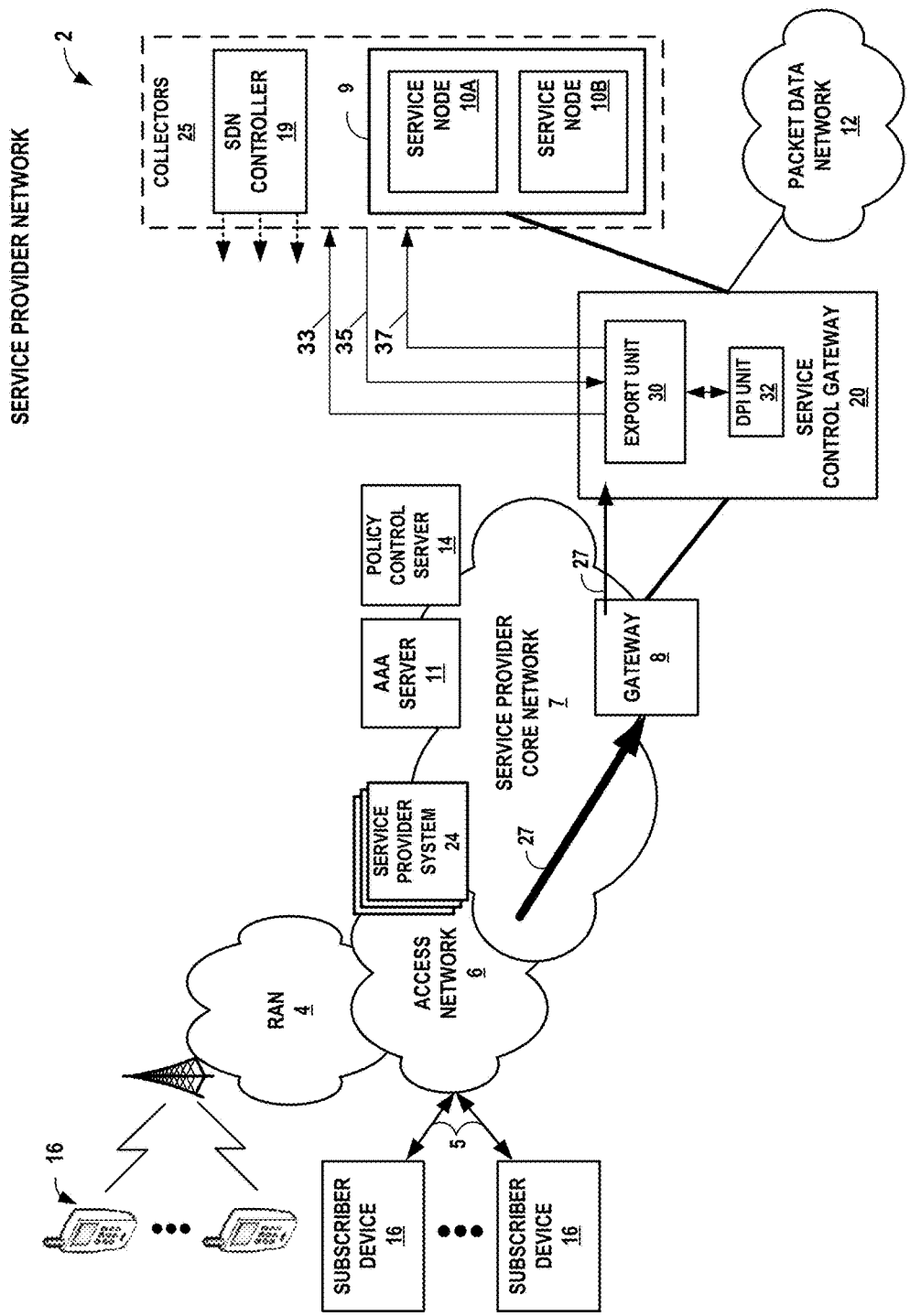
FIG. 1 is a block diagram illustrating an example network system in accordance with techniques described herein.

FIG. 1 illustrates an example network system configured to perform techniques described herein. The example network system of FIG. 1 includes a service provider network 2 that operates as a private network to provide packet-based network services to subscriber devices 16. That is, service provider network 2 provides authentication and establishment of network access for subscriber devices 16 such that the subscriber device may begin exchanging data packets with packet data network (PDN) 12, which may represent an internal packet-based network of the service provider or an external packet-based network such as the Internet.

In the example of FIG. 1, service provider network 2 includes access network 6 ("access network 6") that provides connectivity to PDN 12 via service provider core network 7 including gateway 8. Service provider core network 7 and PDN 12 provide packet-based services that are available for request and use by subscriber devices 16. As examples, core network 7 and/or PDN 12 may provide, for example, bulk data delivery, voice over Internet protocol (VoIP), Internet Protocol television (IPTV), Short Messaging Service (SMS), Wireless Application Protocol (WAP) service, or customer-specific application services.

Packet data network 12 may comprise, for instance, a local area network (LAN), a wide area network (WAN), the Internet, a virtual LAN (VLAN), an enterprise LAN, a layer 3 virtual private network (L3VPN), an Internet Protocol (IP) intranet operated by the service provider that operates access network 6, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Subscriber devices 16 connect to gateway 8 via access network 6 to receive connectivity to subscriber services for applications hosted by subscriber devices 16. A subscriber may represent, for instance, an enterprise, a residential subscriber, or a mobile subscriber. Subscriber devices 16 may represent, for example, personal computers, laptop computers or other types of computing device associated with subscribers. In addition, subscriber devices 16 may comprise mobile devices that access the data services of service provider network 2 via radio access network (RAN) 4. Example mobile subscriber devices include mobile telephones, laptop or desktop computers having, e.g., a 3G wireless card, wireless-capable netbooks, video game devices, pagers, smart phones, personal data assistants (PDAs) or the like.

Each of subscriber devices 16 may be configured to execute a variety of software applications, such as word processing and other office support software, web browsing software, software to support voice calls, video games, videoconferencing, and email, among others. Subscriber devices 16 connect to access network 6 via access links that comprise wired and/or wireless communication links. The term "communication link," as used herein, comprises any form of transport medium, wired or wireless, and can include intermediate nodes such as network devices. Each of access links may include, for instance, aspects of an asymmetric DSL network, WiMAX, a T-1 line, an Integrated Service Digital Network (ISDN), wired Ethernet, or a cellular radio link to provide a few examples.

A network service provider operates, or in some cases leases, elements of access network 6 to provide packet transport between subscriber devices 16 and gateway 8. Access network 6 represents a network that aggregates data traffic from one or more subscribers for transport to/from service provider core network 7 of the service provider. Access network 6 includes network nodes that execute communication protocols to transport control and user data to facilitate communication between subscriber devices 16 and gateway 8. Access network 6 may include a broadband access network, network, a wireless LAN, a public switched telephone network (PSTN), or other type of access network, and may include or otherwise provide connectivity for cellular access networks, such as radio access network (RAN) 4 of FIG. 1. Examples of access network 6 may also include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

Service provider core network 7 (hereinafter, "core network 7") offers packet-based connectivity to subscriber devices 16 attached to access network 6 for accessing PDN 12. Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. PDN 12 may represent an edge network coupled to core network 7, e.g., by a customer edge device such as customer edge switch or router. PDN 12 may include a data center.

In examples of network 2 that include a wireline/broadband access network, gateway 8 may represent a Broadband Network Gateway (BNG), a Broadband Remote Access Server (BRAS), MPLS Provider Edge (PE) router, core router or gateway, or a Cable Modem Termination System (CMTS), for instance. In examples of network 2 that include a cellular access network as access network 6, gateway 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to gateway 8 may be implemented in a switch, service card or other network element or component. Core network 7 may provide access to multiple different access networks 6 conforming to different access types both wireline and wireless, e.g., cellular/GPRS/UMTS, broadband or other wireline, and so forth.

A network service provider that administers at least parts of network 2 typically offers services to subscribers associated with devices, e.g., subscriber devices 16, which access the service provider network. Services offered may include, for example, traditional Internet access, Voice-over-Internet Protocol (VoIP), video and multimedia services, and security services. As described above with respect to access network 6, core network 7 may support multiple types of access network infrastructures that connect to service provider network access gateways to provide access to the offered services. In some instances, network system 2 may include subscriber devices 16 that attach to multiple different access networks 6 having varying architectures.

In general, any one or more of subscriber devices 16 may request authorization and data services by sending a session request to gateway 8. In turn, gateway 8 typically accesses Authentication, Authorization and Accounting (AAA) server 11 to authenticate the subscriber device requesting network access. Once authenticated, any of subscriber devices 16 may send subscriber data traffic toward service provider core network 7 in order to access and receive services provided by PDN 12, and such packets traverse gateway 8 as part of at least one packet flow. Flows 27 illustrated in FIG. 1 represent one or more upstream or "uplink" packet flows from any one or more subscriber devices 16 and directed to PDN 12 via gateway 8, which is a next hop for PDN 12 for traffic from subscribers. Downstream or "downlink" flows originated by PDN 12 are directed to subscriber devices 16 (not shown in FIG. 1).

The term "packet flow," "traffic flow," or simply "flow" refers to a set of packets originating from a particular source device and sent to a particular destination device. Service traffic may include multiple different flows. A single flow of packets, in either the upstream (sourced by one of subscriber devices 16) or downstream (destined for one of subscriber devices 16) direction, may be identified by the following five-tuple ("5-tuple"): <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device may originate multiple packet flows upon authenticating to service provider network 2 and establishing a communication session for receiving data services. Although described with respect to a 5-tuple or an n-tuple, any number of different items may be used to identify a flow in addition to or as an alternative of the 5-tuple or the n-tuple, such as a VLAN ID, VxLAN ID, VRF ID, logical system ID, zones, interfaces, etc.

Service control gateway 20 operates as a gateway for the services complex 9 to anchor the delivery of dynamic service selection and application to packet flows. Service control gateway 20 may perform traffic detection, policy enforcement, and service steering according to techniques described herein. Service control gateway 20 may provide subscriber-aware, device-aware, and/or application-aware traffic detection and granular traffic steering functionality with policy interfaces. Service control gateway 20 may include integrated L4-L7 deep packet inspection (DPI), for instance. Service control gateway 20 may in some cases be combined with other embedded networking functions (such as carrier-grade NAT and firewall/load balancer) to consolidate components of the services complex 9 into a single network element.

Service provider network 2 further includes collectors 25. Collectors 25 may represent one or more devices configured to collect application metadata. Collectors 25 may include, as shown in the example of FIG. 1, a service complex 9 having a cluster of service nodes 10A-10B (collectively, "service nodes 10") that provide an execution environment for corresponding network services. That is, each of service nodes 10 apply one or more services. As examples, service nodes 10 may apply firewall and security services, carrier grade network address translation (CG-NAT), media optimization (voice/video), IPSec/VPN services, deep packet inspection (DPI), HTTP filtering, parental control, caching and content delivery services, web awareness/applications, counting, accounting, charging, and load balancing of packet flows or other types of services applied to network traffic. Each of service nodes 10 in this way represents a service instance. Although illustrated with only two service nodes 10, services complex 9 may include many thousands of such service nodes 10 each providing one or more services to data traffic.

Each of service nodes 10 may alternatively be referred to as a "service point," "value-added service (VAS) point" or node, or "network function virtualization (NFV) node." Network function virtualization involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines instead of on physical hardware appliances. Network function virtualization in the service provider network may provide Value Added Services (VAS) for edge networks such as business edge networks, broadband subscriber management edge networks, and mobile edge networks. Access network 6 of FIG. 1 is an example of an edge network for service provider network 2 of FIG. 1.

Service control gateway 20 may represent is a physical gateway router or switch that connects virtual networks of the services complex 9 to physical networks such core network 9, the Internet, a customer VPN (e.g., L3VPN), another data center, or to non-virtualized servers. In such examples, services complex 9 may include layer two (L2) and layer three (L3) switching and routing components that provide point-to-point connectivity between servers (not shown) that execute one or more of service nodes 10 within a virtual environment. That is, one or more of service nodes 10 may run as virtual machines in a virtual compute environment. Moreover, the compute environment may comprise a scalable cluster of general computing devices, such as x86 processor-based servers. As another example, service nodes 10 may comprise a combination of general purpose computing devices and special purpose appliances. In some examples, service control gateway 20 represents a server, process, virtual machine, or controller executing within services complex 9.

As virtualized, individual network services provided by service nodes 10 can scale just as in a modern data center, through the allocation of virtualized memory, processor utilization, storage and network policies, as well as horizontally by adding additional load-balanced virtual machines. In one example, services complex 9 comprises a set of interconnected, high-performance yet off-the-shelf packet-based routers and switches that implement industry standard protocols. In one example, services complex 9 may comprise off-the-shelf components that provide Internet Protocol (IP) over an Ethernet (IPoE) point-to-point connectivity.

In the illustrated example, collectors 25 also include a software-defined networking (SDN) controller 19. The SDN controller 19 may provide a high-level controller for configuring and managing routing and switching infrastructure of service provider network 2 (e.g., gateway 8, service control gateway 20, core network 7 and service nodes 10). The SDN controller 19 provides a logically and in some cases physically centralized controller for facilitating operation of one or more virtual networks within services complex. In some instances, the SDN controller 19 manages deployment of virtual machines within the operating environment of value-added services complex 9. The SDN controller 19 communicates with service control gateway 20 to specify information for implementing a service chain, such as virtual routing and forwarding instances configuration.

Service chain information provided by an SDN controller 19 may specify any combination and ordering of value-added services provided by service nodes 10, traffic engineering information (e.g., labels or next hops) for tunneling or otherwise transporting (e.g., MPLS or IP tunnels) packet flows along service paths, rate limits, Type Of Service (TOS) markings or packet classifiers that specify criteria for matching packet flows to a service chain. Additional information regarding a SDN controller operating as a virtual network controller in conjunction with other devices of services complex 9 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

Although collectors 9 are shown as representing one or more service nodes 10 and SDN controller 19, collectors 9 may include only service nodes 10, only SDN controller 19 or any combination of service nodes and SDN controllers. Collectors 9 may also include other devices or units not shown in the example of FIG. 1. Collectors 9 may generally represent any type of network device configured to collect (or, in other words, consume) information exported by service control gateway 20 via an export protocol, such as an Internet protocol flow information export (IPFIX) protocol.

More information regarding the IPFIX protocol can be found in a series of requests for comments (RFCs) issued by the IPFIX Internet engineering task force (IETF) work group. The base of the IPFIX protocol is found in RFC 7011, entitled "Specification of the IP Flow Information Export (IPFIX) Protocol for the Exchange of Flow Information," dated September 2013, the entire contents of which are hereby incorporated by reference as if set forth in its entirety. The information model of the IPFIX protocol is found in RFC 7012, entitled "Information Model for IP Flow Information Export (IPFIX)," dated September 2013, the entire contents of which are hereby incorporated by reference as if set forth in its entirety. The guidelines for defining information elements for the IPFIX protocol is found in RFC 7013, entitled "Guidelines for Authors and Reviewers of IP Flow Information Export (IPFIX) Information Elements," dated September 2013, the entire contents of which are hereby incorporated by reference as if set forth in its entirety. Flow selection techniques for the IPFIX protocol is found in RFC 7014, entitled "Flow Selection Techniques," dated September 2013, the entire contents of which are hereby incorporated by reference as if set forth in its entirety. A discussion of flow aggregation for the IPFIX protocol is found in RFC 7014, entitled "Flow Aggregation for the IP Flow Information Export (IPFIX) Protocol," dated September 2013, the entire contents of which are hereby incorporated by reference as if set forth in its entirety. A discussion of exporting type information for IPFIX information elements is found in RFC 5610, entitled "Exporting Type Information for IP Flow Information Export (IPFIX) Information Elements," dated July 2009, the entire contents of which are hereby incorporated by reference as if set forth in its entirety herein. A discuss of how to export data in IPFIX is provided in RFC 6313, entitled "Export of Structured Data in IP Flow Information Export (IPFIX)," dated July 2011, the entire contents of which are hereby incorporated by reference as if set forth in its entirety herein.

As further shown in the example of FIG. 1, service control gateway 20 may include an export unit 30 and a DPI unit 32. Export unit 30 may represent a unit configured to execute the export protocol, e.g., the IPFIX protocol. Export unit 30 may be configured in some examples to export application metadata to collectors 25. Applications, in this context, may be defined as network protocols used by networking processes that exchange packets (such as web applications, peer-to-peer applications, file transfer, email applications, etc.). In some examples, applications may be characterized by other criteria, some of which are application-specific. Application-specific examples include a web application to a specific domain, per-user specific traffic, a video application with a specific encoder/decoder ("codec") and the like. More information regarding export of application information may be found in RFC 6759, entitled "Cisco Systems Export of Application Information in IP Flow Information Export (IPFIX)," dated November 2012, the entire contents of which are hereby incorporated by reference as if set forth in their entirety. Generally, application metadata may include information related to any applications that exchange data or control information above the network layer (which is also referred to as layer three—or L3—given the network layer is the third layer in the open systems interconnections (OSI) model of computer networking).

DPI unit 32 may represent a unit configured to perform a deep packet inspection (DPI) with respect to network flows 27 to obtain application metadata and any other metadata (including flow information), e.g., for the purposes of providing services via service complex 9. Export unit 30 may interface with DPI unit 32 to obtain the application metadata extracted from network flows 27 by DPI unit 32. Export unit 30 may export the application metadata to collectors 25.

The application metadata allows networks, such as service provider network 2, to support application environments. In other words, networks are increasingly leveraging application metadata to provide an "awareness" of applications and application states to enable the network to potentially better enhance user experience, manage resources and understand network behaviors.

Examples of application metadata may include hypertext transfer protocol (HTTP) uniform resource identifiers (URIs), peers from a peer-to-peer network (e.g., BitTorrent® peers), user login information for websites, or any number of other types of application metadata. Application metadata may also include a domain name service (DNS) request detail or DNS response detail, chat messenger data (e.g., login IDs, files, video being uploaded, etc.), and web mail application data (e.g., login IDs, files, video being uploaded, etc.). Service provider network 2 may leverage the wide variety of application metadata to support or enhance a number of value added services (VAS) and product offerings related to analytics, network security, distributed denial of service (DDOS) prevention, quality of experience, quality of services, and policy-based charging to provide a few examples.

Using IPFIX as executed by export unit 30, service control gateway 20 may export one or more of the above different types of application metadata to collectors 25. However, collectors 25 may execute different services, which may only require some subset of the overall application metadata. Given the large number of applications and corresponding application metadata, attempting to export all of the application metadata to each of the collectors may result in needless consumption of resources (e.g., computing and storage resources) of service control gateway 20 and increased bandwidth consumption. Moreover, receiving such potentially extensive amounts of application metadata may result in potentially wasteful filtering of application metadata by collectors 25 to identify the subset of the application metadata that is relevant to the particular service or services offered by each of the collectors 25.

Although the IPFIX protocol provides a well-defined mechanism by which to export flow information out of networks, define packet and session attributes that can be exported, and define new data types that can be exported, the IPFIX protocol does not currently allow for a way by which to export application metadata in a manner that addresses the potentially extensive and growing nature of application metadata. Failure to address this problem may result in thousands of new information elements being defined in the IPFIX protocol. Similar export protocols may also suffer the same problems. In addition, applications may continue to evolve with newer application versions and new applications may emerge that result in additional application metadata. As a result, it may be difficult to incorporate newer application metadata as standard information elements in a time bound manner.

Moreover, the IPFIX protocol (and each of many similar export protocols) does not provide a standard way by which one of collectors 25 may dynamically configure the service control gateway 20 to export application metadata relevant only to the one of collectors 25. Restated from a different perspective, the IPFIX protocol may not allow for interaction between the exporter and collectors 25 such that collectors 25 may communicate with the export unit 30 of the service control gateway 20. In some examples, the export unit 30 communicates unidirectionally with collectors 25. In some examples, collectors 25 may communicate using out of band communications that are not supported by the IPFIX protocol (or other similar export protocols).

In accordance with techniques described herein and as shown in FIG. 1, service control gateway 20 may publish application metadata detection capability using the IPFIX protocol (or other similar export protocols). In order to publish or, in other words, advertise the application metadata detection capability, service control gateway 20 may determine the types of application metadata that service control gateway 20 has a capability to detect through analysis of network packets (e.g., associated with flows 27). Service control gateway 20 may invoke export unit 30, which may query DPI unit 32 to determine the types of application metadata that service control gateway 20 has the capability to detect.

In other words, DPI unit 32 may include a DPI engine and associated libraries that configure the DPI engine to detect a wide range of information, including application information. DPI unit 32 may have the ability to upgrade its detection capability online by software or application signature updates. Export unit 30 may interface with the DPI unit 32 to identify application metadata detection capabilities representative of the types of application metadata that the first network device, e.g., service control gateway 20, has the capability to detect. After determining the types of application metadata, export unit 30 of service control gateway 20 may execute the export protocol to advertise or, in other words, publish the types of the application metadata to collectors 25, which may represent network devices configured to collect a subset of the application metadata. The advertisement is shown as advertisement 33 in the example of FIG. 1.

Collectors 25 may receive the advertisement 33 sent via the IPFIX protocol. Each of collectors 25 may then determine a subset of the advertised types of application metadata that each of collectors 25 is configured to collect. In other words, an administrator or other network operator may configure each of collectors 25 to collect a different subset of all available types of application metadata capable of being advertised. Collectors 25, upon receiving advertisement 33, may compare the respective configured subset of application metadata types (AMT) to the advertised types of application metadata and determine, based on the intersection of each of the respective configured subsets to the advertised application metadata types, the subset of the advertised application metadata types to be exported.

Each of collectors 25 may then request that export unit 30 of the service control gateway 20 export the subset of the advertised application metadata types. The collector may issue the request by some proprietary out of band communication or by extending IPFIX protocol as described herein. The request is shown as request 35 in the example of FIG. 1. In some examples, request 35 may request the subset of the types of application metadata and includes an indication of when corresponding application metadata is to be generated. In some examples, request 35 requests a subset of the types of application metadata for a particular application. In this respect, collectors 25 may request export unit 30 to export only a subset of the advertised application data corresponding to the subset of the application metadata types relevant to delivering or facilitating delivery of their corresponding service or function. In other words, collectors 25 may receive via the IPFIX protocol a portion of a subset of the application metadata corresponding to the requested subset of the types of the application metadata, where the portion of the subset of the application metadata is sent prior to the export unit 30 collecting the entire subset of the application metadata corresponding to the requested subset.

In response to receiving the request 35 via the IPFIX protocol, export unit 30 may obtain the requested subset of the advertised application metadata types for each of the collectors 25 providing a request 35. Export unit 30 may, to obtain the requested subsets, aggregate the subsets, removing any redundant or overlapping application metadata from the subsets. Export unit 30 may next interface with DPI unit 32 to configure DPI unit 32 to monitor flows 27 and extract the aggregated subsets of the application metadata corresponding to the requested subsets of advertised application metadata types.

DPI unit 32 may process individual packets of network flows 27 to extract the aggregated subset of application metadata. DPI unit 32 may provide the aggregated subsets of application metadata to export unit 30, which may generate the requested subset of application metadata for the requesting ones of collectors 25 based on the aggregated subset of application metadata types. Export unit 30 executes the IPFIX protocol to deliver each of the requested subsets of advertised application metadata to the requesting ones of collectors 25. The exported subsets of application metadata are shown as exported subsets 37 in the example of FIG. 1.

In this respect, the techniques may enable the IPFIX protocol as executed by service control gateway 20 and collectors 25 to discover device application metadata detection capabilities dynamically and to interface with each other to configure service control gateway 20 (or any other application metadata export device, e.g., gateway 8 or another router, switch, firewall, or other network device of service provider network 2) to provide only a subset of application metadata relevant to services provided by collectors 25. Given that the nature of the advertisement 33, requests 35 and exported subsets 37 are template-based messages, the techniques further allow for a way by which to generate various versions of customized templates for a particular one of collectors 25. By facilitating this dynamic customization within the IPFIX protocol, the techniques may promote new value added services, including DPI processes, and facilitate growth potentially within software-defined networks (SDNs) and virtualized environments.

Figure 2:
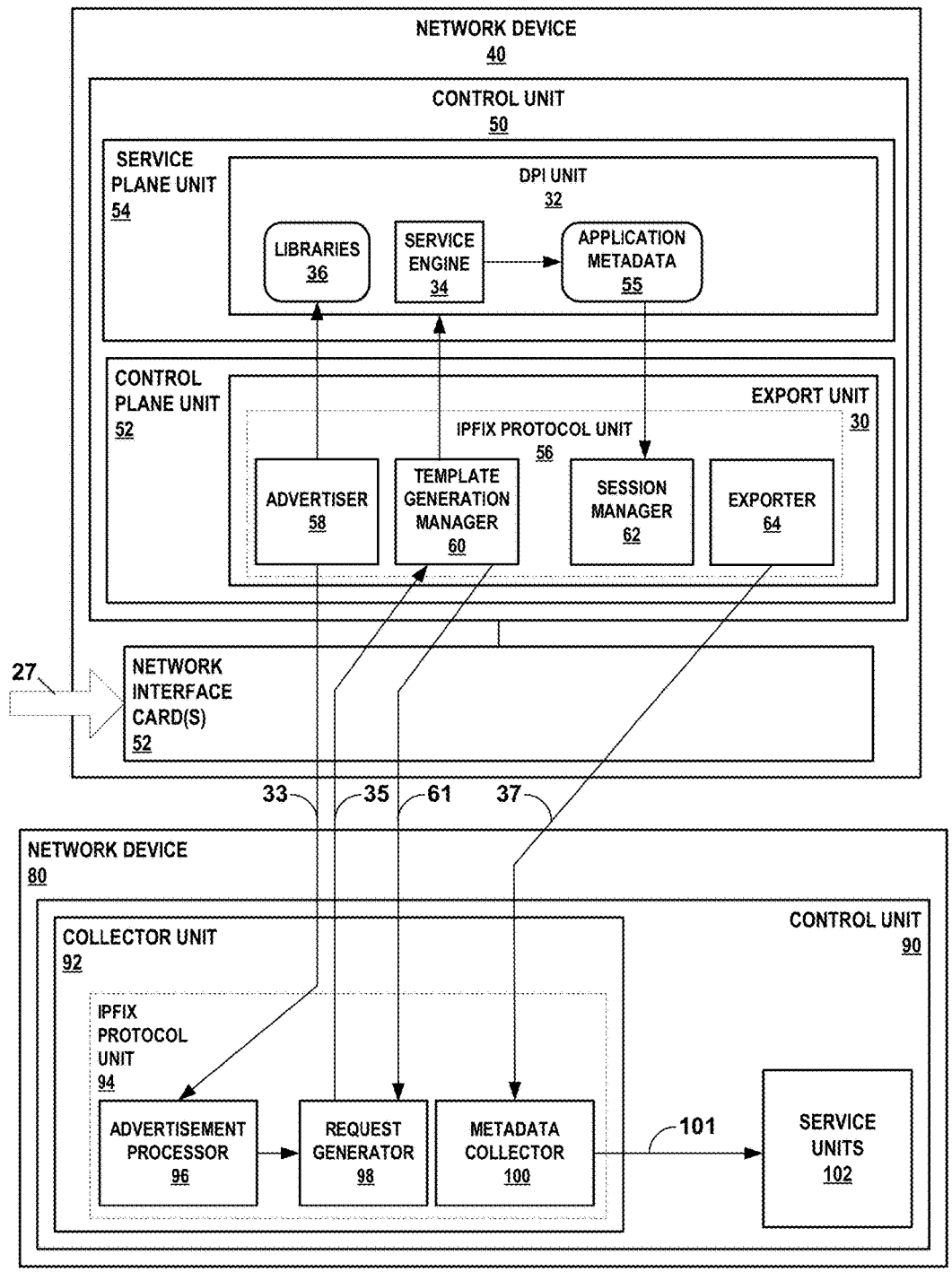
FIG. 2 is block diagram illustrating, in further detail, example network devices configured to perform various aspects of the techniques described in this disclosure.

FIG. 2 is block diagram illustrating, in further detail, example network devices according to techniques described in this disclosure. Network device 40 may represent an example instance of service control gateway 20 of FIG. 1. Network device 40 includes a control unit 50 coupled to one or more network interface card(s) 52 ("NICs 52"), which transmit and receive packet data via one or more communication links.

Control unit 50 represents, as one example, at least one processor that executes software instructions, such as those used to define a software or computer program, stored to a tangible computer-readable medium (not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 50 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware.

Network device 80 may represent an example instance of one of collectors 25. network device 80 includes a control unit 90 that may be similar to and potentially substantially similar to control unit 50 of network device 40 in that control unit 90 may represent tangible computer-readable memory and one or more processors that are, when executing software instructions stored to the tangible computer-readable memory, configured to and/or dedicated hardware configured to perform the techniques described in this disclosure.

As further shown in the example of FIG. 2, control unit 50 of network device 40 includes a control plane unit 52 and a service plane unit 54. In other words, control unit 50 may be divided into three logical or physical "planes" to include a first control or routing plane (e.g., control plane unit 52), a second data or forwarding plane (which is not shown for ease of illustration purposes) and a third service plane (e.g., service plane unit 54. In this respect, control unit 50 may implement three separate functionalities, e.g., the routing, forwarding and service functionalities, either logically, e.g., as separate software instances executing on the same set of hardware components, physically, e.g., as separate physical dedicated hardware components that either statically implement the functionality in hardware or dynamically execute software or a computer program to implement the functionality, or some combination of logical and physical implementations. In some examples, control plane unit 52 may logically implement service plane 54 in that service plane unit 54 is provided as a virtual service plane executing within control plane unit 52. In this virtualized service plane implementation, control plane unit 52 may be considered to perform the functions attributed to service plane unit 54.

Control plane unit 52 of control unit 50 may provide the routing functionality of network device 40 (assuming network device 40 is, for purposes of example, a router). In this respect, control plane unit 52 may represent hardware or a combination of hardware and software of control unit 50 that implements routing protocols (not shown in the example FIG. 2) by which routing information (not shown in the example of FIG. 2) may be determined. The routing information may include information defining a topology of a network, such as network 7. Control plane unit 52 may resolve the topology defined by the routing information to select or determine one or more routes through network 7. Control plane unit 52 may then update the data plane with these routes, where the data plane maintains these routes as forwarding information (not shown in the example of FIG. 2). The forwarding or data plane may represent hardware or a combination of hardware and software of control unit 50 that forwards network traffic in accordance with the forwarding information.

Service plane unit 54 may represent hardware or a combination of hardware and software of control unit 50 responsible for providing and managing one or more services, such as a DPI services. Service plane unit 54 of control unit 50 provides an operating environment for service-related modules, such as DPI unit 32. As described above, DPI unit 32 represents a unit configured to perform deep packet inspection and other application metadata detection. DPI unit 32 may include a service engine 34 and associated libraries 36. Service engine 34 may represent hardware or a combination of hardware and software configured to execute libraries 36 to perform deep packet inspection and thereby detect application metadata 55.

Control plane unit 52 may, as shown in the example of FIG. 1, include export unit 30. Export unit 30 may, as noted as one example above, execute the IPFIX protocol. In this respect, export unit 30 may include or otherwise implement an IPFIX protocol unit 56. IPFIX protocol unit 56 may, in other words, represent a unit configured to perform the IPFIX protocol referenced above. IPFIX protocol unit 56 may include a number of functional units (which may be implemented, in some examples, as dedicated hardware or a combination of hardware and software), such as an advertiser 58, a template generation manager 60, a session manager 62, and an exporter 64.

Control unit 90 of network device 80 (which may also be referred to as "collector network device 80") may include a collector unit 92 configured to implement the export protocol from the perspective of collector network device 80. Collector unit 92 shown in the example of FIG. 2 may include (in the same way as export unit 30) IPFIX protocol unit 94. IPFIX protocol unit 94 of collector unit 92 may include a number of functional units similar to IPFIX protocol unit 56, such as an advertisement processor 96, a request generator 98 and a metadata collector 100.

Although shown as only including units from particular exporter and collector perspectives in the example of FIG. 2, IPFIX protocol unit 56 may also include units 96-100 of IPFIX protocol unit 94 while IPFIX protocol unit 94 may also include units 58-64 of IPFIX protocol unit 56. When both of units 56 and 94 include units from both collector and exporter perspectives, IPFIX protocol unit 56 may be similar to if not substantially similar to IPFIX protocol unit 94. Both of IPFIX protocol units 56 and 94 may include both perspectives in instances where network devices 40 and 80 act in both of the exporter and collectors roles.

In operation, IPFIX protocol unit 94 of collector unit 92 connects to IPFIX protocol unit 56 of export unit 30 using one of a transmission control protocol (TCP), a user datagram protocol (UDP), or a stream control transmission protocol (STCP). Depending on which of the foregoing protocols are selected, there may be slight variations in the operations of the IPFIX protocol. However, it is assumed herein for purposes of example that IPFIX protocol unit 94 connects to IPFIX protocol unit 56 using TCP. Variations from the following TCP workflow are noted below for UDP. The SCTP workflow is similar to TCP workflow described below. IPFIX protocol unit 94 may connect to IPFIX protocol unit 56 using TCP (via a defined TCP port). The term transport session and IPFIX session will also be used to indicate connection by either of mechanisms (TCP/UDP/SCTP) mentioned above.

IPFIX protocol unit 56, in response to IPFIX protocol unit 94 establishing the IPFIX session, invokes advertiser 58. Advertiser 58 generates advertisement 33 that advertises application metadata detection capabilities, which may refer to the different types of application metadata that DPI unit 30 is capable of detecting. The types of application metadata may be identified by an application type (or, in other words, identifier) and corresponding metadata type (or, in other words, identifier). To generate advertisement 33, advertiser 58 may query DPI unit 32 to determine the application metadata that network device 40 has the capability to detect. Advertiser 58 may forward the advertisement 33 to IPFIX protocol unit 94 on the IPFIX session.

IPFIX protocol unit 94 may receive advertisement 33 and invoke advertisement processor 96. Advertisement processor 96 represents a unit configured to process advertisement 33. Advertisement processor 96 may be configured to determine a subset of the advertised application metadata types that the network device 80 is configured to collect (e.g., as an intersection of the configured application metadata types to collect and the advertised application metadata types). Advertisement processor 96 may provide the determined subset of the advertised application metadata types to the request generator 98 of IPFIX protocol unit 94. Request generator 98 may represent a unit configured to generate request 35 based on the determined subset of the advertised application metadata types. Request generator 98 may send request 35 via the transport session to IPFIX protocol unit 56 to effectively request that IPFIX protocol unit 56 export the application metadata corresponding to the subset of the advertised application metadata types to network device 80.

The variations between connecting via TCP and UDP arise due to UDP being a connectionless protocol. As such, when IPFIX protocol unit 94 connects to IPFIX protocol unit 56 via UDP, it provides connection detail where it can receive advertisement. Based on the received information, IPFIX protocol unit 56 may send advertisement 33. For providing this information, IPFIX protocol unit 94 acts as an exporter and sends a template with destinationIpv4 address and destination port or destinationIpv6address and destination port information element followed by data record with actual destination value. IPFIX protocol unit 56 in this case may act as a collector and store destination address information as to where it may send an advertisement.

In response to receiving request 35, IPFIX protocol unit 56 may invoke template generation manager 60. Template generation manager 60 represents a unit configured to process request 35 to generate a new template, which the template generation manager 60 may transmit via the IPFIX session to acknowledge the request 35. The acknowledgement is shown as response 61 in the example of FIG. 2. Template generation manager 60 may, when an error occurs, send an error message rather than an acknowledgement, in which case response 61 may represent the error message.

Template generation manager 60 may interface with DPI unit 32 to indicate that DPI unit 32 is to generate application metadata 55 corresponding to the requested subset of the application metadata types specified in request 35. In instances where the requested subset of the application metadata types specified in request 35 is already being generated by DPI unit 32 (due to a previous request from IPFIX protocol unit 94 of network device 80 or some other collector), template generation manager 60 may not interface with DPI unit 32 to configure DPI unit 32 to generate the requested subset of application metadata 55 as DPI unit 32 is already generating the requested application metadata corresponding to the requested subset of application metadata types. Template generation manager 60 may operate in the above manner with respect to every new IPFIX session.

After configuring the transport session with respect to the request and possibly configuring DPI unit 32 to generate the requested subset of the advertised application metadata, IPFIX protocol unit 56 may invoke session manager 62 to manage the established IPFIX session. Session manager 62 may represent a unit configured to direct packets from flows 27 through service engine 34 of DPI unit 32 and store the application metadata 55 generated as a result of service engine 34 processing the packets of flows 27. Session manager 62 may then parse application metadata 55 to generate the subset of the advertised application metadata corresponding to the requested subset of application metadata types. Session manager 62 may provide the subset of the advertised application metadata to exporter 64.

Exporter 64 represents a unit configured to export the subset of the advertised application metadata as one or more IPFIX data records 37 to IPFIX protocol unit 94 of network device 80. IPFIX protocol unit 94 may invoke metadata collector 100. Metadata collector 100 may represent a unit configured to collect IPFIX data records 37 and parse the records 37 in accordance with the IPFIX protocol to extract the requested subset of the advertised application metadata. Metadata collector 100 may provide the subset of the advertised application metadata as application metadata 101.

As further shown in the example of FIG. 2, control unit 90 includes service units 102, which may represent one or more service units configured to perform any of the services discussed above (including the value added services). Service units 102 may process application metadata 101 to facilitate delivery of their respective services. For example, assuming network device 80 represents SDN controller 19 shown in FIG. 1, service units 102 may represent one or more routing services that generate forwarding information based on routing information representative of the topology of network 7. Service units 102 may process application metadata 101 to identify configuration changes to be applied with respect to network 7. The configuration changes may include route configuration changes that affect forwarding of flows 27 within network 7. Service units 102 may, in this example, interface with network 7 (e.g., routers of network 7 that are not shown in the example of FIG. 1 for ease of illustration purposes) to deploy the configuration changes.

In another example where network device 80 is assumed to represent a network security device configured to apply network security services with respect to network 7 in which network device 40 interfaces, service units 102 may represent the one or more network security services. Service units 102 process, in this example, application metadata 101 to identify security threats to the network. Service units 102 may interface with network 7 to deploy countermeasures to the identified security threats. The countermeasures may include quarantining packets of flows 27 identified as providing the security threat, dropping of flows 27 identified as providing the security threat, etc.

The foregoing discusses how IPFIX protocol units 56 and 94 may generally interface when establishing a new session and requesting a single subset of the advertised application metadata. In operation, network devices 80 may issue multiple requests for different subsets of application metadata. The following provides a discussion of how IPFIX protocol unit 56 of network device 40 may interact with IPFIX protocol unit 94 in the context of multiple requests and specifically in the context of the IPFIX protocol using what the IPFIX protocol refers to as "templates." Although described with respect to the IPFIX protocol, the techniques may be performed, as noted above, with respect to any export protocol.

Advertiser 58 of IPFIX protocol unit 56 may operate in the manner described above to output advertisement 33. More specifically, advertisement 33 may send a series of templates as an aggregation of information element described below. For the sake of clarity information elements are described by their name. However it should be noted that the actual sending mechanism consist of sending an IPFIX template which describes information element id and length, followed by "Information Element Data Type Template" as defined in RFC 5610 (which provides the data type of information elements) followed by data record consisting of actual data/value of that information element. "Information Element Data Type Template" may be required for private information element. First such aggregation may be referred as an "Exporter Hello Template," which is sent by export unit 30 when a transport session with collector unit 92 is established. An example of exporter hello template 33 is defined in the following table. In all template tables illustration term basic list, sub template list and sub template multi list correspond to structures defined in RFC 6313:

| Information Element Description | Remarks |
| --- | --- |
| DPI Engine Version | Exporter DPI engine identifier. Privately defined information element with data type as string. |
| Sub template list of IPv4 address and destination port | IPv4 Address at which collector can initiate a connection and send App meta data request. IANA defined standard information element for destinationIPv4Address and destinationTransportField are used. Meant primarily for UDP based IPFIX sessions |
| Sub template list of IPv6 address and destination port | IPv6 Address at which collector can initiate a connection and send App meta data request. IANA defined standard information element for destinationIPv6Address and destinationTransportField are used. Meant primarily for UDP based IPFIX sessions. |
| Private Enterprise number | IANA defined information element to indicate private enterprise number of exporter |

Advertisement 33 may also include the following "Application Category Template", which advertiser 58 sends to indicate various application categories, sub-categories and groups (or, in other words, types) that DPI unit 32 has the capability to detect.

| Information Element Description | Remarks |
| --- | --- |
| Basic List of Application Category name | Standard information element mentioned in RFC 6759 |
| Basic List of Application Group name | Standard information element mentioned in RFC 6759 |
| Basic List of Application subcategory name | Standard information elements mentioned in RFC 6759 |

Advertisement 33 may also include the following "Flow Match Template", which advertiser 58 sends to indicate various matching criteria for the flow where DPI processing and extraction of application meta data is to be done. As indicated earlier while field names are mentioned below, first of all IPFIX template is sent, followed by "Information Element Data Type Template" for non-standard private information element as defined in RFC 5610 followed by data record consisting of actual data/value of that information element. Depending on exporter capabilities flow match template may vary.

| Information Element Description | Remarks |
| --- | --- |
| SourceIP v4 Prefix | IANA defined standard information element. |
| Source IP v6 Prefix | IANA defined standard information element. |
| Protocol | IANA defined standard information element. |
| Destination IP v4 Prefix | IANA defined standard information element. |
| Destination IP v6 Prefix | IANA defined standard information element. |
| Source Port | IANA defined standard information element. |
| Destination Port | IANA defined standard information element. |
| User Name | Private. String data type. |
| VRF/Logical system instance | IANA defined standard information element. |
| Interface ID | IANA defined standard information element. |
| Vlan Id | IANA defined standard information element. |

| Information Element Description | Remarks |
| --- | --- |
| Vxlan id | IANA defined standard information element. |

Advertisement 33 may also include the following "Application Information Template", which advertiser 58 sends to indicate various applications types that DPI unit 32 is configured to detect.

| Information Element Description | Remarks |
| --- | --- |
| Application ID | Standard information element as mentioned in RFC 6759 |
| Application Name | Standard information element as mentioned in RFC 6759 |
| Application Description | Standard information element as mentioned in RFC 6759 |
| Classification Engine Id | Standard information element as mentioned in RFC 6759 |
| Application Category | Standard information element as mentioned in RFC 6759 |
| Application sub category | Standard information element as mentioned in RFC 6759 |
| Application group Name | Standard information element as mentioned in RFC 6759 |
| P2p technology | Standard information element as mentioned in RFC 6759 |
| Tunnel technology | Standard information element as mentioned in RFC 6759 |
| Encrypted technology | Standard information element as mentioned in RFC 6759 |
| Basic list of UDP Port | IANA defined ports for well known application. This may not be valid for all applications and value of 0 indicates the same. |
| Basic list of TCP Port | IANA defined ports for well known application. This may not be valid for all applications and value of 0 indicates the same. |

Advertisement 33 may also include the following "Application Metadata Information Template", which advertiser 58 sends to indicate various application metadata types that DPI unit 32 is configured to detect. As indicated earlier while field names are mentioned below, first of all IPFIX template is sent, followed by "Information Element Data Type Template" for non standard private information element as defined in RFC 5610 followed by data record consisting of actual data/value of that information element.

| Information Element Description | Remarks |
| --- | --- |
| Application Id | IANA defined standard information element. |
| Sub template List of: | |
| Application meta data Id | Private information element. Data type unsigned32 |
| Application meta data name | Private information element. Data type String. |
| Application meta data type | Private information element. Data type unsigned8 |
| Application meta data description | Private information element. Data type String |

Advertisement processor 96 of IPFIX protocol unit 94 may receive advertisement 33 and determine the subset of the advertised application metadata types to which IPFIX protocol unit 94 is configured to collect. Request generator 98 may then generate request 35 in the manner described above. Request 35 may include the following "Application Metadata Request Template".

| Information Element Description | Remarks |
| --- | --- |
| Template consist of either IPv4 destination and port Or IPv6 destination and port | Collector address where data records and future advertisement will be received. This is primarily required for UDP based transport session. For connection oriented transport sessions same connection might be used for advertisement by exporter, meta data request by collector as well as meta data record export by exporter. IANA defined standard information element values are used for IPv4 destination, IPv6 destination and destination port. |
| Request Id | Request identifier. Uses IANA defined "Common Properties Id" information element. |
| Sub template List of Flow Match Template described above. | Match template are used to decide whether a particular flow session will be inspected by DPI module or not. |

-continued

| Information Element Description | Remarks |
| --- | --- |
| Basic List of | |
| Application Id | Application Id as indicated by Application Information Template. This is a private information element (IE) of unsigned32 type |
| Application meta data Id | Application meta data id as indicated by Application Metadata Information Template. This is a private IE of unsigned32 type |
| IE Push | Private IE. Data type is unsigned 8. It indicates whether a data record needs to be generated immediately when this information element is observed, Valid values:<br>0—Exporter to decide when to send information<br>1—Immediately generate data record once this meta data is observed<br>2—Generate data record on transaction boundary |
| Basic list of other standard Information element. | Any other flow session related information covered by already defined standard information element like octet count, packet count, source and destination addresses etc. |

Given the unidirectional nature of IPFIX protocol request generator 98 may form request 35. Request generator 98, although part of the collector, acts as an exporter to send out detail of application metadata, request generator 98 is configured to collect. To export the application metadata request generator 98 is configured to collect, request generator 98 sends a template which defines one or more of the following elements: collector address, a list of elements to be used for match criteria, a list of application metadata element, and a list of standard information element. Request generator 98 also sends an option template that identifies the matching elements. Request generator 98 may also send multiple data record, where each of the data records may include values for the above information elements.

For each IPFIX data type, template generation manager 60 may instantiate a template referred to as "App Information Element Data Template." The "App Information Element Data Template" may include the following: Information Element Id (marked as private information element for requested application metadata), and Information element data type. Template generation manager 60 may, on receiving request 35, perform one or more of the following actions:

1) For a particular IPFIX session, and for each new application metadata requested, determine whether a privately generated information element ID exists. When the privately generated information element ID does not exist, generate a new information element ID. In addition, determine whether the data type of information element ID can be mapped to one of an existing "app information element data template." When the data type of information element ID cannot be mapped to an existing "app information element data template," generate a new template, else reuse the same template.
2) For any information element used in matching criteria, generate another template.
3) For any other standard information element, generate another template.
4) generate a new sub template multi list comprising all templates in 1-3.
5) generate response template described in more detail below.

| Information Element Description | Remarks |
| --- | --- |
| Response Id | As was sent in request. This matches request - response. Uses IANA defined common properties id information element. |
| App data template Id | Uses IANA defined templateId information element. The templated Id used is the one generated for step 4 in above paragraph. |
| Sub template list of App metadata to information element ID mapping template, which consists of:<br>Application Id<br>Application Meta data Id | Mapping for data record |
| Information element id generated dynamically for the above combination | Information element id is private information element id. Enterprise number is the one sent by exporter in "Exporter Hello Template". |
| information element data type | |
| Template Id | Template ID corresponds to one of App information element data type template ID or a template created for conveying this particular information element |

For example, assume that request 35 requested the following application metadata types SMTP_BANNER, HTTP_URI and octet count for sessions where destination address matches 192.168.1.1. For illustration purpose it is assumed that the request ID is 100. This may result in sending out of a template, an option template and associated data records as described above. For illustration purposes, assume that "App metadata to information element ID" template has an ID of 500. Template generation manager 60 may perform one or more of the following actions:

1) Check whether SMTP_BANNER has been assigned a private information element ID. If not assigned, generate one. For illustration purposes, assume that the private information element ID is 5000. Further, determine whether SMTP_BANNER can be mapped to "App Information Element Data Template." For illustration purpose, it is assumed that template generation manager has already created an "App Information Element Data Template" for string type data with ID 300. Since SMTP_BANNER has data of type string it will be mapped to this template.

2) Similarly, for HTTP_URI, again determine whether a private information element ID has been assigned. If not assigned, generate one ID, e.g., 9000. Since HTTP_URI is also of type string, map the HTTP URI to a template with ID 300.
3) Generate a template ID, e.g., 602, for match criteria elements.
4) Generate template ID, e.g., 603, for other standard information element, which may include octet count in this example.
5) Generate another template ID, e.g., 604, which may identify a sub-template of multi-list type with template IDs 300, 602 and 603 as different templates of which the sub-template may consist.
6) Generate a response template with, for example, template ID 705. Data record for template 705 may include a response ID of 100 (e.g., the request ID used by request 35) and app data template ID as 604.

Template generation manager 60 sends all templates 300, 602, 603, 604 and 705 to request generator 98. It also sends a data record for template 705. Data record for template 705 will look like this:

---

Request id = 100
App data template id = 604 (All app data record send by exporter will correspond to this template. It is of type sub template multi list and will contain the actual template id whose data is available). For deletion request this id will be used.
List of data corresponding to "App metadata to information element mapping" template having ID 500. There will be two entries:
AppId = SMTP
App Meta data id = SMTP_BANNER
Private Information element id assigned = 5000
Private information element data type = String
Template Id = 300
AppId = HTTP
App Meta data id = HTTP_URI
Private Information element id assigned = 9000
Private information element data type = String
Template Id = 300

---

Deletion request corresponds to addition request. Request generator 98 may request for deletion by sending a deletion request template followed by data record. Deletion request template consist of app data template id that is created on a per request basis. On seeing deletion request, exporter unit 30 withdraws all unique template created for the request. It may reconfigure DPI engine to stop analyzing application and application meta data for which there are no active collectors. As an illustration for the above request a deletion data record will look like this
"Delete App meta data"

---

| Information Element description | Remarks |
|---|---|
| App data template id = 604 | Id of multi list template generated for request |

---

By having a multi list template with each application meta data having its own template, it is ensured that a push model of sending application meta data as soon as it is generated can be supported. Data record will consist of only details of application meta data that was found. Further such an arrangement also ensures transaction level push model can be supported where for application having distinct transaction semantics, all meta data that has been collected for a transaction can be exported. By having sub template multi list multiple instances of same data can also be recorded and sent.

Template generation manager 60 may also respond with an error by sending response 61 with the following error template.

---

| Information Element Name | Remarks |
|---|---|
| Response Id | As was sent in request. This matches request - response.<br>Uses IANA defined "common properties id" information element. |
| AbsoluteError | IANA defined standard information element |
| RelativeError | IANA defined standard information element |

---

While described as being sent by export unit 30, collector unit 92 may also send a message that includes the above error template to communicate any errors in advertisement 33 or any other communication.

In this respect, the techniques may facilitate an open and standard way by which to request and receive application and application metadata information. The techniques may provide new DPI markets as well as potentially facilitate development of SDN and virtualized environments.

Figure 3:
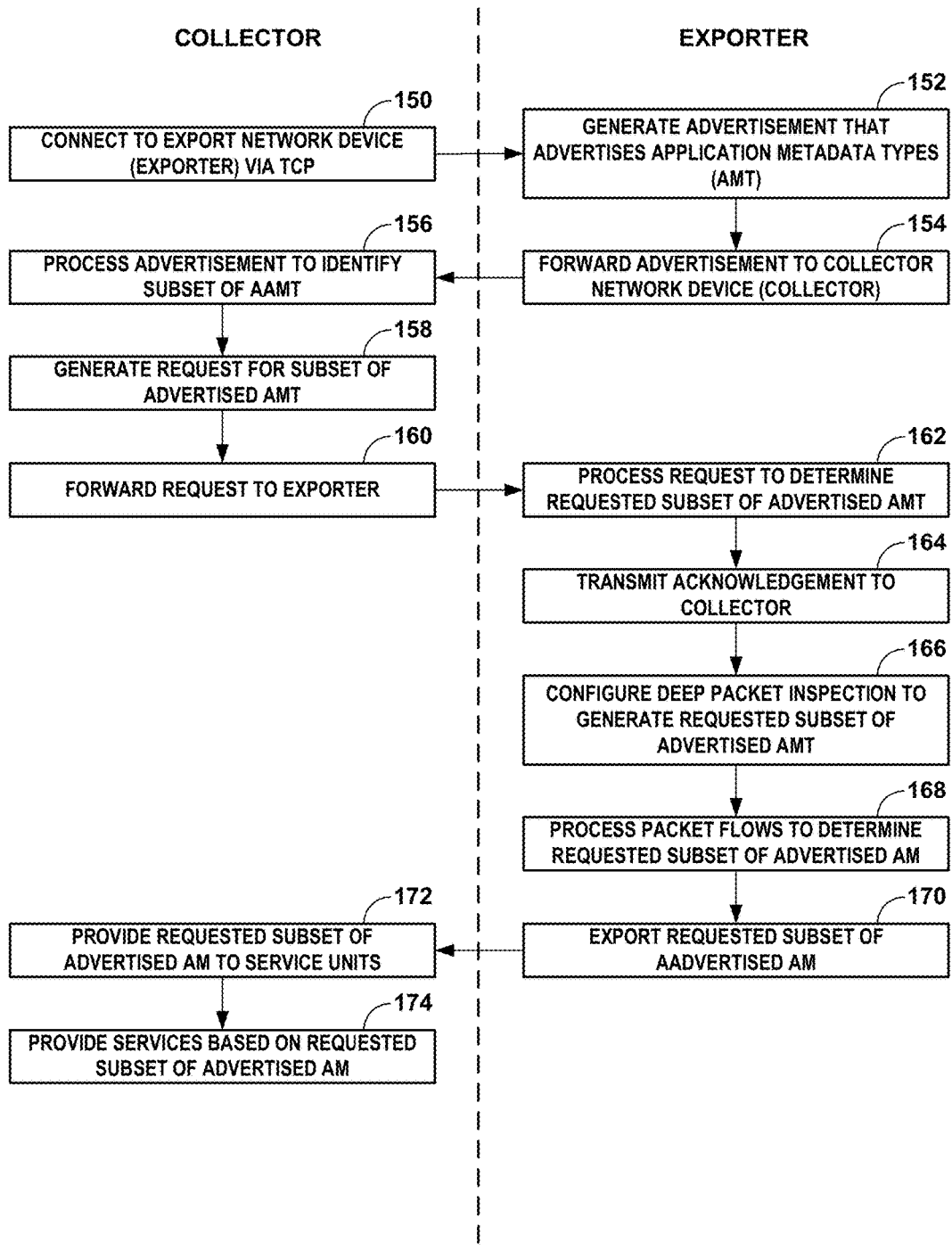
FIG. 3 is a flowchart illustrating exemplary operation of collector and exporter network devices in performing various aspects of the techniques described in this disclosure.

FIG. 3 is a flowchart illustrating exemplary operation of network devices 40 and 80 of FIG. 2 in performing various aspects of the techniques described in this disclosure. Initially, IPFIX protocol unit 94 of collector unit 92 included within collector network device 80 connects to IPFIX protocol unit 56 of export unit 30 included within export network device 40 via, as one example, TCP (150). IPFIX protocol unit 56, in response to IPFIX protocol unit 94 establishing the TCP session, invokes advertiser 58. Advertiser 58 generates advertisement 33 that advertises application metadata detection capabilities in the form of advertised application metadata types (AMT) (152). Advertiser 48 may forward the advertisement 33 to IPFIX protocol unit 94 via the TCP session (154).

IPFIX protocol unit 94 may receive advertisement 33 and invoke advertisement processor 96. Advertisement processor 96 processes advertisement 33 to determine a subset of the advertised application metadata types that the network device 80 is configured to collect (156). Advertisement processor 96 may provide the determined subset of the advertised application metadata types to the request generator 98 of IPFIX protocol unit 94. Request generator 98 may generate request 35 based on the determined subset of the advertised application metadata types (158). Request generator 98 may send request 35 via the TCP session to IPFIX protocol unit 56 to effectively request that IPFIX protocol unit 56 export the subset of the advertised application metadata (AM) corresponding to the advertised application metadata types to network device 80 (160).

In response to receiving request 35, IPFIX protocol unit 56 may invoke template generation manager 60. Template generation manager 60 process request 35 to generate a new template reflective of the requested subset of the advertised application metadata types (162). The template generation manager 60 may also transmit the new template via the TCP session to acknowledge the request 35 as described above in more detail (164). Template generation manager 60 may also interface with DPI unit 32 to indicate that DPI unit 32 is to generate application metadata 55 corresponding to the requested subset of the application metadata types specified in request 35 (166).

In instances where the requested subset of the application metadata specified in request 35 is already being generated by DPI unit 32 (due to a previous request from IPFIX protocol unit 94 of network device 80 or some other collector), template generation manager 60 may not interface with DPI unit 32 to configure DPI unit 32 to generate the requested subset of application metadata 55 as DPI unit 32 is already generating the requested application metadata.

After configuring the TCP session with respect to the request and possibly configuring DPI unit 32 to generate the requested subset of the advertised application metadata, IPFIX protocol unit 56 may invoke session manager 62 to manage the established TCP session. Session manager 62 may represent a unit configured to direct packets from flows 27 through service engine 34 of DPI unit 32 and stores the application metadata 55 generated as a result of service engine 34 processing the packets of flows 27. Session manager 62 may then parse application metadata 55 to generate the requested subset of the advertised application metadata corresponding to the requested subset of application metadata types. In this respect, session manager 62 may, in conjunction with DPI unit 32, process packet flows 27 to determine the requested subset of advertised application metadata (168). Session manager 62 may provide the requested subset of the advertised application metadata to exporter 64 (170).

Exporter 64 exports the requested subset of the advertised application metadata as one or more records 37 to IPFIX protocol unit 94 of network device 80. IPFIX protocol unit 94 may invoke metadata collector 100 in response to receiving records 37. Metadata collector 100 may collect records 37 and parse the records 37 in accordance with the IPFIX protocol to extract the requested subset of the advertised application metadata. Metadata collector 100 may provide the requested subset of the advertised application metadata as application metadata 101 to service units 102 (172). Service units 102 may provide, as described in more detail above, services based on the requested subset of the advertised application metadata (174).

Figure 4:
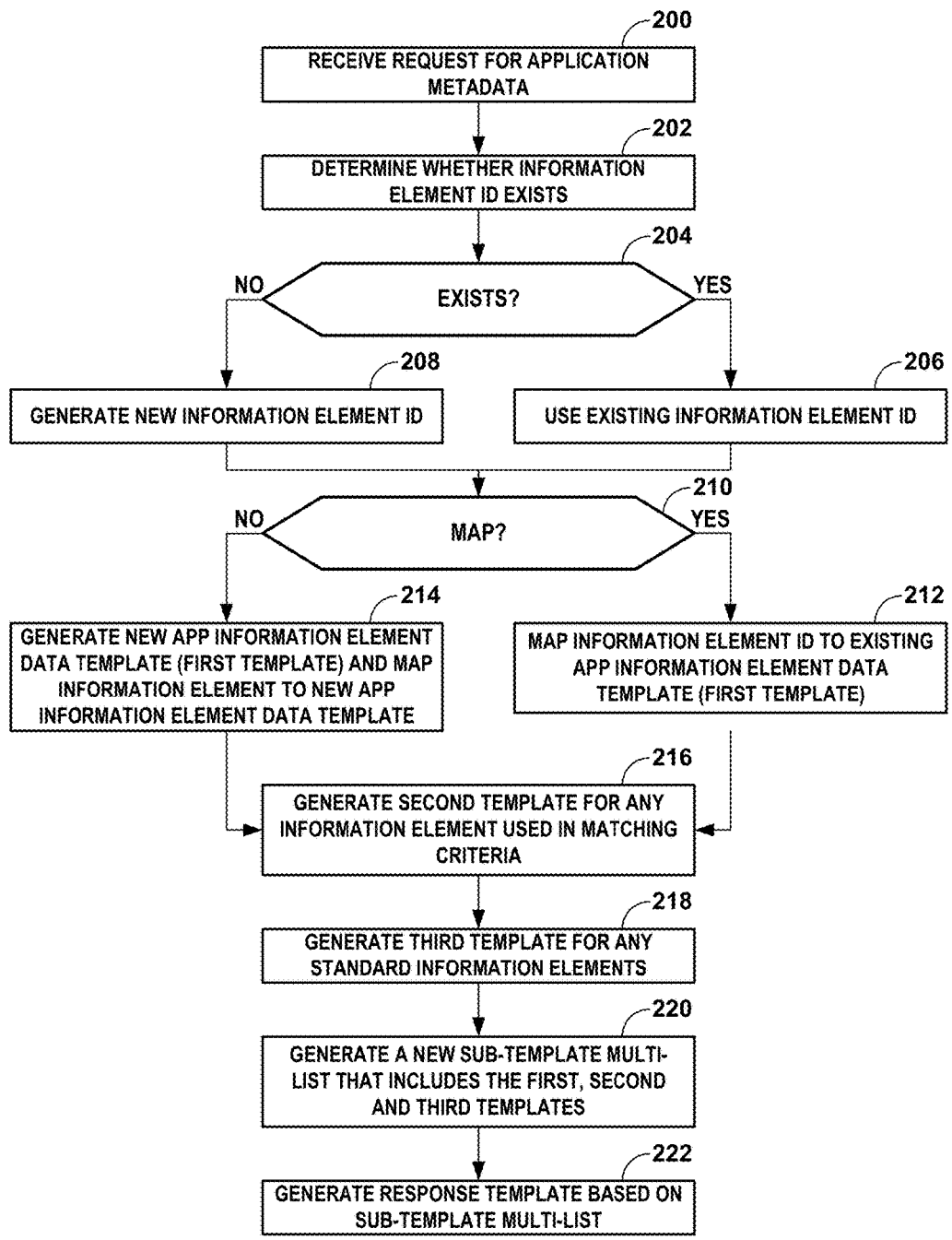
FIG. 4 is a flowchart illustrating exemplary operation of a network device in generating a template in accordance with various aspects of the techniques described in this disclosure.

FIG. 4 is a flowchart illustrating exemplary operation of a network device in generating a template in accordance with various aspects of the techniques described in this disclosure. As one example, network device 40 may perform the following template generation techniques. In particular, template generation manager 60 of network device 40 may, as one example, perform the template generation techniques described below.

Template generation manager 60 may receive a request 35 for application metadata (200). For a particular IPFIX session, and in response to request 35, template generation manager 60 may determine whether an information element ID exists (202). When the information element ID already exists ("YES" 204), template generation manager 60 may use the existing information element ID (206). When the information element ID does not exist ("NO" 204), template generation manager 60 may generate a new information element ID (208).

In addition, template generation manager 60 may determine whether the data type of information element ID can be mapped to one of an existing "app information element data template" (210). When the data type of information element ID can be mapped (e.g., the data type is the same as that of an existing "app information element data template") ("YES" 210), template generation manager 60 may map the information element ID to an existing app information element data template. When the data type of information element ID cannot be mapped into an existing "app information element data template" ("NO" 210), template generation manager 60 may generate a new app information element data template (214) and map the information element to the new app information element data template. The app information element data template may be referred to as a first template.

Template generation manager 60 may also generate a second template for any information element used in matching criteria as described in more detail above (216). Template generation manager 60 may further generate a third template for any other standard information elements (218). Template generation manager 60 may next generate a new sub template multi list comprising the first, second and third templates (220). Template generation manager 60 may generate response template based on the template multi-list as described in more detail above (222).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:

determining, by a first network device configured to export application metadata via an Internet Protocol Flow Information eXport (IPFIX) protocol, types of the application metadata that the first network device has a capability to detect through analysis of network packets, the application metadata comprising data representative of network protocols used by networking processes that exchange packets; and executing, by the first network device, the IPFIX protocol to advertise the types of application metadata to a second network device configured to collect a subset of the application metadata receiving, by the first network device and from the second network device, a request via the IPFIX protocol for a subset of the types of the application metadata corresponding, at least in part, to the subset of the application metadata the second network device is configured to collect; and executing, by the first network device, the IPFIX protocol to export a subset of the application metadata to the second network device, the subset of the application metadata corresponding to the requested subset of the application metadata types.

2. The method of claim 1, wherein the advertisement comprises a first IPFIX template and associated data records that specifies the types of application metadata as a list of application identifiers and application metadata identifiers, and wherein the request comprises a second IPFIX template and associated data records that specifies the requested subset of the types of the application metadata as a list of one or more the application identifiers and the one or more of the application metadata identifiers.

3. The method of claim 1, wherein the first network device includes a deep packet inspection (DPI) unit configured to analyze the network packets to detect the application metadata, and wherein determining the types of the application metadata comprises analyzing the DPI unit to determine the application metadata that the first network device has the capability to detect.

4. The method of claim 3, further comprising:

dynamically upgrading, after executing the IPFIX protocol to advertise the types of the application metadata, the DPI unit to detect additional types of application metadata;

reanalyzing the DPI unit to determine updated application metadata that the first network device has the capability to detect, the updated application metadata including the additional types of application metadata; and executing the IPFIX protocol to advertise the additional types of the application metadata to the second network device.

5. The method of claim 1, further comprising:

receiving a subsequent request from the second network device modifying the subset of the types of the application metadata of the original request from the second network device;

modifying the subset of the types of the application metadata requested by the original request based on the subsequent request to determine a modified subset of the types of the application metadata; and executing the IPFIX protocol to export a modified subset of the application metadata to the second network device, the modified subset of the application metadata corresponding to the modified subset of the types of the application metadata.

6. A first network device configured to export application metadata via an Internet Protocol Flow Information eXport (IPFIX) protocol, the first network device comprising:

one or more processors configured to determine types of the application metadata that the first network device has a capability to detect through analysis of network packets, the application metadata comprising data representative of network protocols used by networking processes that exchange packets; and a memory configured to store the application metadata, wherein the one or more processors are further configured to:

execute the IPFIX protocol to advertise the types of the application metadata to a second network device configured to collect a subset of the application metadata;

receive, from the second network device, a request via the IPFIX protocol for a subset of the types of the application metadata corresponding, at least in part, to the subset of the application metadata the second network device is configured to collect; and execute the IPFIX protocol to export a subset of the application metadata to the second network device, the subset of the application metadata corresponding to the requested subset of the application metadata types.

7. The first network device of claim 6, wherein the advertisement comprises a first IPFIX template and associated data records that specifies the types of application metadata as a list of application identifiers and application metadata identifiers, and wherein the request comprises a second IPFIX template and associated data records that specifies the requested subset of the types of the application metadata as a list of one or more the application identifiers and the one or more of the application metadata identifiers.

8. The first network device of claim 6, further comprising a deep packet inspection (DPI) unit configured to analyze the network packets to detect the application metadata, wherein the one or more processors are configured to interface with the DPI unit to determine the application metadata that the first network device has the capability to detect.

9. The first network device of claim 8, wherein the DPI unit is dynamically upgraded, after executing the IPFIX protocol to advertise the types of the application metadata, to detect additional types of application metadata, and wherein the one or more processors interface with the DPI unit again to determine updated application metadata that the first network device has the capability to detect, the updated application metadata including the additional types of application metadata, and execute the IPFIX protocol to advertise the additional types of the application metadata to the second network device.

10. The first network device of claim 6, wherein the one or more processors are further configured to receive a subsequent request from the second network device modifying the subset of the types of the application metadata of the original request from the second network device, modify the subset of the types of the application metadata requested by the original request based on the subsequent request to determine a modified subset of the types of the application metadata, and execute the IPFIX protocol to export a modified subset of the application metadata to the second network device, the modified subset of the application metadata corresponding to the modified subset of the types of the application metadata.

11. A method comprising:
receiving, by a first network device, an advertisement via an Internet Protocol Flow Information eXport (IPFIX) protocol, the advertisement advertising types of application metadata that a second network device is capable of detecting through analysis of network traffic and exporting via the IPFIX protocol, the application metadata comprising data representative of network protocols used by networking processes that exchange packets;
determining, by the first network device, a subset of the types of the application metadata that the first network device is configured to collect;
executing, by the first network device, the IPFIX protocol to request that the second network device export the determined subset of the types of the application metadata to the first network device;
receiving, by the first network device, via the IPFIX protocol a subset of the application metadata corresponding to the requested subset of the types of the application metadata; and
processing, by the first network device, the subset of application metadata to provide one or more services.

12. The method of claim 11,
wherein the advertisement comprises a first IPFIX template and associated data records that specifies the types of application metadata as a list of application identifiers and application metadata identifiers, and
wherein the request comprises a second IPFIX template and associated data records that specifies the requested subset of the types of the application metadata as a list of one or more the application identifiers and the one or more of the application metadata identifiers.

13. The method of claim 11,
wherein the first network device comprises a software defined network controller device that configures a network in which the second network device interfaces, and
wherein processing the subset of the application metadata comprises processing the subset of the application metadata to identify configuration changes to be applied with respect to the network, and
wherein the method further comprises interfacing with the network to deploy the configuration changes.

14. The method of claim 11,
wherein the first network device comprises a network security device configured to apply network security services with respect to a network in which the second network device interfaces,
wherein processing the subset of the application metadata comprises processing the subset of the application metadata to identify security threats to the network, and
wherein the method further comprises interfacing with the network to deploy countermeasures to the identified security threats.

15. The method of claim 11, further comprising:
executing the IPFIX protocol to issue a subsequent request to the second network device, the subsequent request modifying the subset of the types of the application metadata of the original request; and
receiving a modified subset of the application metadata from the second network device via the IPFIX protocol, the modified subset of the application metadata corresponding to the modified subset of the types of the application metadata.

16. The method of claim 11, further comprising:
receiving an updated advertisement from the second network device via the IPFIX protocol, the updated advertisement including additional types of the application metadata that the second network device is capable of detecting in addition to the types of the application metadata advertised via the advertisement;
determining an additional subset of the types of the application metadata that the first network device is configured to collect; and
executing the IPFIX protocol to request a subset of the additional types of the application metadata.

17. The method of claim 11, wherein the request further includes an indication of when corresponding application metadata is to be generated.

18. The method of claim 11, wherein receiving via the IPFIX protocol the subset of the application metadata comprises receiving via the IPFIX protocol a portion of the subset of the application metadata corresponding to the requested subset of the types of the application metadata, where the portion of the subset of the application metadata is sent prior to the second network device collecting the entire subset of the application metadata corresponding to the requested subset.

19. A first network device comprising:
an interface configured to receive an advertisement via an Internet Protocol Flow Information eXport (IPFIX) protocol, the advertisement advertising types of application metadata that a second network device is capable of detecting through analysis of network traffic and exporting via the IPFIX protocol, and the application metadata comprising data representative of network protocols used by networking processes that exchange packets; and
one or more processors configured to determine a subset of the types of application metadata that the first network device is configured to collect, and execute the IPFIX protocol to request that the second network device export a subset of the types of the advertised application metadata to the first network device,
wherein the interface is further configured to receive via the IPFIX protocol a subset of the application metadata corresponding to the requested subset of the types of the application metadata, and
wherein the one or more processors are further configured to process the subset of application metadata to provide one or more services.

20. The first network device of claim 19,
wherein the advertisement comprises a first IPFIX template and associated data records that specifies the types of application metadata as a list of application identifiers and application metadata identifiers, and
wherein the request comprises a second IPFIX template and associated data records that specifies the requested subset of the types of the application metadata as a list of one or more the application identifiers and the one or more of the application metadata identifiers.

21. The first network device of claim 19,
wherein the first network device comprises a software defined network controller device that configures a network in which the second network device interfaces, and
wherein the one or more processors are configured to process the subset of the application metadata to identify configuration changes to be applied with respect to the network, and interface with the network to deploy the configuration changes.

22. The first network device of claim 19,
wherein the first network device comprises a network security device configured to apply network security services with respect to a network in which the second network device interfaces, and
wherein the one or more processors are configured to process the subset of the application metadata to identify security threats to the network, and interface with the network to deploy countermeasures to the identified security threats.

23. The first network device of claim 19, wherein the one or more processors are further configured to execute the IPFIX protocol to issue a subsequent request to the second network device, the subsequent request modifying the subset of the types of the application metadata of the original request, and receive a modified subset of the application metadata from the second network device via the IPFIX protocol, the modified subset of the application metadata corresponding to the modified subset of the types of the application metadata.

24. The first network device of claim 19, wherein the one or more processors are further configured to receive an updated advertisement from the second network device via the IPFIX protocol, the updated advertisement including additional types of the application metadata that the second network device is capable of detecting in addition to the types of the application metadata advertised via the advertisement, determine an additional subset of the types of the application metadata that the first network device is configured to collect, and execute the IPFIX protocol to request a subset of the additional types of the application metadata.

* * * * *